Figure 1:
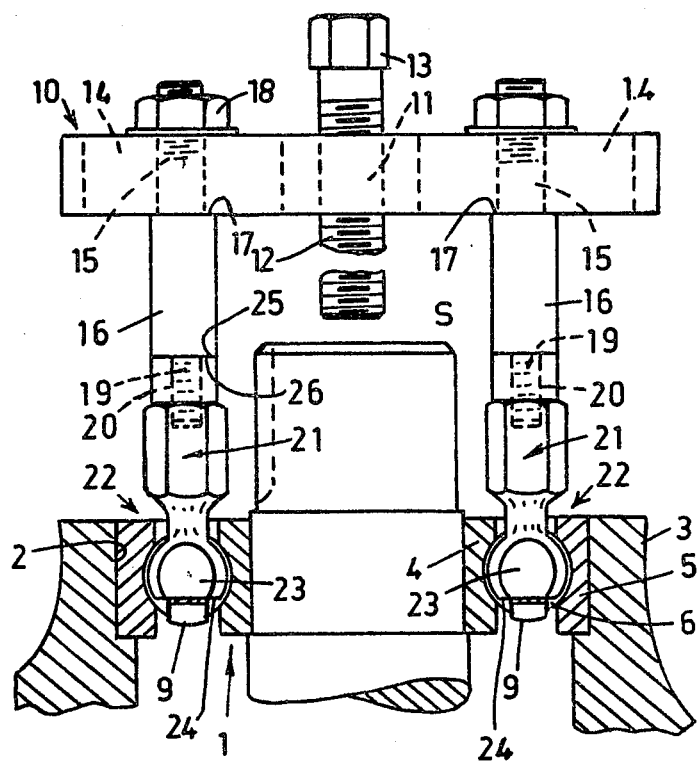

United States Patent [19]

Denmeade et al.

[11] Patent Number: 4,471,517

[45] Date of Patent: Sep. 18, 1984

[54] BALL BEARING PULLER

[76] Inventors: Robert G. Denmeade, Lot 21 Old Pitt Town Rd., Box Hill, Sydney, N.S.W.; James G. Denmeade, 30 Hopman St., Greystanes, Sydney, N.S.W., both of Australia

[21] Appl. No.: 470,636

[22] Filed: Feb. 28, 1983

[30] Foreign Application Priority Data

Mar. 1, 1982 [AU] Australia .............................. PF2896
Sep. 8, 1982 [AU] Australia .............................. PF5788

[51] Int. Cl.$^3$ .............................................. B23P 19/04
[52] U.S. Cl. ..................................................... 29/259
[58] Field of Search .......................... 29/258, 259, 260

[56] References Cited

U.S. PATENT DOCUMENTS

| | | | |
|---|---|---|---|
| 2,821,777 | 2/1958 | Keister | 29/259 |
| 3,605,242 | 9/1971 | Kuffner | 29/259 |
| 4,034,458 | 7/1977 | Ford et al. | 29/259 |

Primary Examiner—Robert C. Watson
Attorney, Agent, or Firm—Nelson E. Kimmelman

[57] ABSTRACT

A ball bearing puller comprising a head member with a central force applying bolt and a number of extractor bars rotatably and slidably mounted at first ends in slots radiating from the bolt. The extractor bars can be clamped at any position along the slots so as to be non-rotatable. Each extractor bar has a modified sphere at its other end with inner and outer race clearing flats which are parallel and positioned symmetrically one either side of the longitudinal axis of the extractor bar and a cage clearing flat at the extremity of said one end intersected by said longitudinal axis.

4 Claims, 2 Drawing Figures

BALL BEARING PULLER

This invention provides an apparatus for the removal of a ball bearing from a recess in which it is mounted or from a shaft on which it is mounted. An example of the former is the bearing recess in the wall of a gearbox.

In a gearbox having a bearing mounted as above the removal of the bearing is often very difficult because of the lack of access to the bearing. Frequently the gearbox has to be completely dismantled in order to couple a pulling device to the bearing or in order that other means can be applied to remove the bearing. Even when a gearbox is completely dismantled difficulty in bearing removal can be encountered if no planning for this has been built into the gearbox at the time of construction.

Some gearboxes have a counterbore at the rear end of the bearing recess enabling a punch to be brought to bear on the inner race of the bearing and blows on the punch are used to drive the bearing from the recess. In almost every case however the shaft supported by the bearing has to be removed from the bearing and this almost always means the gearbox has to be completely dismantled. It is sometimes possible to apply a pushing force to eject the bearing from the recess having a counterbore as described above. Like problems often occur with the removal of a bearing from a shaft.

The apparatus of this invention can be coupled to the bearing whilst it is in place and force can be applied to withdraw the bearing from its recess. In many instances this can be accomplished with little or no dismantling of the machinery or gearbox of which the bearing forms part. The savings in time and effort are at once apparent.

There have been attempts to provide universal tools for removal of ball bearings of different diameters, one example of this is U.S. Pat. No. 4,034,458 in which threaded rods are provided with special terminal end members adapted to be engaged between the inner and outer races of the bearing in the ball grooves. The rods pass through corresponding holes of one of several sets of holes in an end member having a central force applying screw and the force applied by the screw is transferred through an intermediate member to the housing in which the bearing recess in located. Depending upon the diameter of the race so one or other of the hole sets are selected.

The patent 4,034,458 provides expensive single-use threaded rods with terminal end members having limited application. As all bearings are not the same there is a need for a versatile pulling device able to accomodate various ball diameters and spacings between the inner and outer races of the bearing. In the case of the above U.S. patent a complete threaded rod with a special terminal end to suit the ball bearing to be removed must be used. With the present invention relatively inexpensive replacement elements are provided to co-operate with a basic pulling frame, the replacement elements are designed to suit a range of bearings.

In the application of the device of the patent 4,034,458 part of the "cage" which holds the balls of the bearing in correct circumferential spaced relationship must be removed or folded back on the exposed side of the bearing to permit the terminal ends of the puller to be engaged in the race grooves. Only the outer cage portion is accessible and therefore it is only this portion which can be removed. The under, inaccessible, portion of the cage frequently prevents easy and adequate engagement of the ball-like special ends of the puller rods in the race grooves. This is due to the raised sections of the cage between the balls, which sections separate adjacent balls.

This problem is overcome by the present invention.

Broadly, the invention comprises a bearing puller having a head member with at least two slots radiating from a central threaded hole through said head member; a threaded force applying rod engaged in the central threaded hole; a plurality of extractor bars, a shank on a first end of each extractor bar with the shanks of the extractor bars passing through the respective slots and clamping means on the shanks to cause shoulders on the extractor bars adjacent said shanks to be clamped against the underface of the head member; a first part of a threaded coupling means at the other end of each extractor bar; a plurality of puller elements each comprised of a body part having a working end and an attachment end, the attachment ends each incorporate a second part of the threaded coupling means whereby the puller elements can be removably secured respectively to the extractor bars, the working end of each puller element comprises a modified sphere joined by a neck to said body part; the modification of the sphere of each puller element includes a pair of parallel faces in planes which are symmetrically disposed relative to a primary axis passing through the puller element body and which is also the axis of the threaded coupling means, said neck and the spherical portions of the sphere; the spacing between the planes is predetermined in accordance with the spacing between the inner and outer races of the ball bearing with which the puller element is designed to co-operate; and a cage clearing surface on the sphere, said surface lies diametrically opposite said neck and is intersected by said primary axis.

Figure 2:
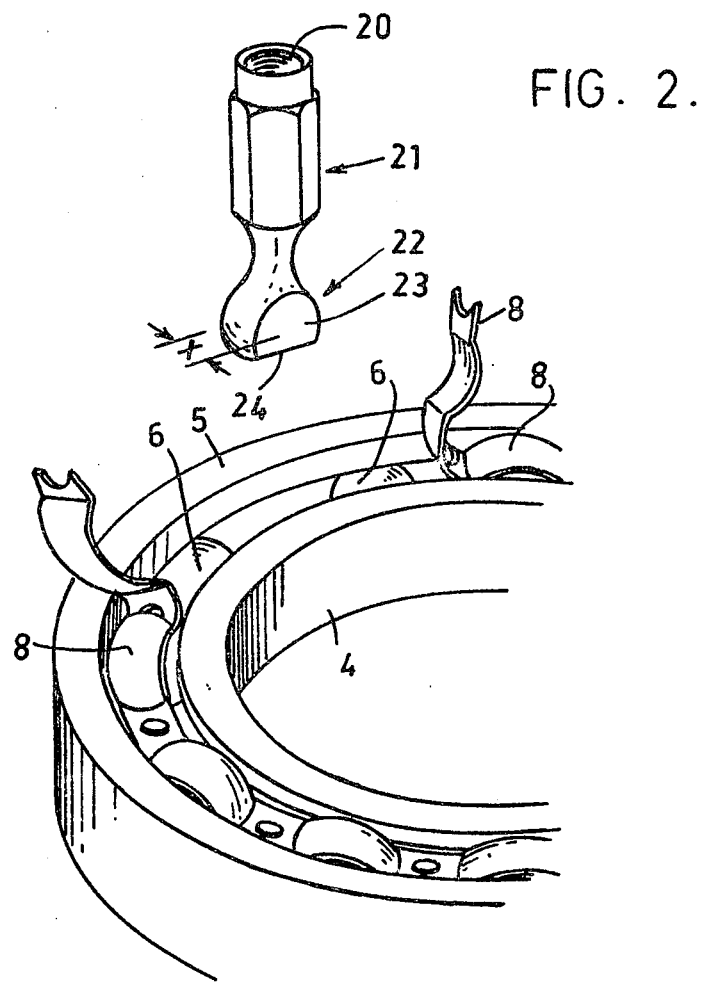

A preferred embodiment of the invention will now be described with reference to the accompanying drawings, in which:

FIG. 1 is a sectional view, partly in section, of a puller according to the invention engaged in a ball bearing and FIG. 2 is a perspective view of part of a ball bearing and a puller element according to the invention.

The invention is best described in use and to that end FIG. 1 shows a puller according to the invention associated with a ball bearing to be removed from a recess in a housing. The ball bearing is shown in detail in FIG. 2 and is indicated 1, it is located in a recess 2 in a machined part 3, for example a recess in a gearbox housing. The ball bearing comprises an inner race 4 and an outer race 5 which is frictionally secured in the recess 2. A shaft 5 is frictionally housed in the bore of the inner race 4. A number of spaced spherical balls 6 are supported by the grooves of the inner and outer races and are held in circumferential spaced relationship by a cage having an upper part 8 and a lower part 9 rivetted or otherwise held together at depressed zones separating the balls.

The puller comprises a head member 10 with a central threaded hole 11 in which there is a threaded bolt 12 with a hexagonal head 13 to allow a bolt turning torque to be applied to the bolt. Radiating from the axis of the bolt 12 there are two closed end slots 14 in the head member 10. The head member 10 can be formed with additional slotted legs or as a slotted plate, usually three is the maximum number of slots and two is the most common number.

There is an extractor bar 16 for each slot 14. Each extractor bar 14 has a shoulder 17 adjacent a portion of reduced cross-section to form a shank 15, which is rotatable and slidable in a slot 14. Each extractor bar 16 is locked against rotation at a required position along a slot 14 in which it is engaged by clamping the shoulder 17 against the under face of the head 10 by means of a nut and washer combination 18.

The puller bars 16 at their other ends are each provided with a first part of a threaded coupling means, in this case a threaded spigot 19, which engages in a threaded hole 20 in a body part of a puller element 21. At the other end each puller element 21 has a reduced diameter neck part which terminates in a modified sphere 22 which has a diameter the same as or slightly less than the diameter of the balls of the bearing to be removed. There are two flats 23 on each sphere 22 in parallel planes symmetrical with the axis passing longitudinally through the puller element 21, the hole 20 and the neck. The distance between the flats 23 is indicated X and is less than the radial spacing of the adjacent surfaces of the inner and outer races 4 and 5.

It follows that if there is sufficient space between two balls of a bearing to be removed, either before or after displacement of a ball circumferentially in the race grooves following the removal or displacement of part of the cage 8 (as in FIG. 2), the spherical working end 22 of a puller element 21 can be passed between the races into approximate alignment with the race grooves.

It will be understood that if the spheres 22 are inserted between balls in the races they will overlie the raised up portions of the cage which separate the balls and penetration of the spheres 22 into the races to the extent that they are aligned with the grooves in the races cannot be readily accomplished, if at all. To overcome this each sphere is provided with a face 24 which lies opposite the neck of the puller element. The face 24 is intersected by the axis of the puller element body and is conveniently at right angles thereto. The face 24 can be flat or curved and if curved its curvature is greater than that of the sphere 22. For convenience of manufacture each face 24 is flat. The formation of the flat removes that portion of the sphere which could otherwise bear on the cage of the ball bearing and prevent the introduction of the sphere into the race to the required extend to permit engagement of the spherical surfaces of the member 22 in the race grooves.

Engagement of the members 22 in the race grooves is accomplished by orienting the members 22 with the flats 23 so that they can pass between the inner and outer races 4, inserting the members 22 into the race and rotating the extractor bars to engage the spherical surfaces of the members 22 in the race grooves. The foregoing is performed with the puller elements tightened securely to the extractor bar and with the nuts 18 loosened. When the spherical surfaces of the members 22 are engaged in the race grooves the bolt 12 is centralised relative to the member on which it will exert pressure, in this case the shaft S, and the nuts 18 are tightened to clamp the extractor bars in fixed rotational and lateral positions in the slots 14 of the head 10.

Race removal is accomplished by then rotating the bolt 12 to bring the inner end thereof against the end of the shaft S. Continued application of torque to the bolt head 13 will cause the extractor bars to exert a pulling force on the race through the engagement of the members 22 in the race grooves. When sufficient force is applied to overcome the frictional engagement of the outer race 5 in the recess 2 and the inner race 4 on the shaft S the race will commence to move towards the head 10.

The body parts of the puller elements 21 are provided with a number of flats to allow a spanner to be used to tighten the spigot 19 into the threads of the hole 20. If desired flats can also be provided on the extractor bar although normally the extractor bar would be held in a vice or some other rigid member during the mounting of the puller elements. When assembled the shoulders 25 of the extractor bars are clamped hard against the shoulders 26 of the puller elements. If desired the situation can be reversed with the hole 20 in the extractor bar and the spigot 19 on the puller element.

We claim:

1. A bearing puller having a head member with at least two slots radiating from a central threaded hole through said head member; a threaded force applying rod engaged in the central threaded hole; a plurality of extractor bars, a shank on a first end of each extractor bar with the shanks of the extractor bars passing through the respective slots and clamping means on the shanks to cause shoulders on the extractor bars adjacent said shanks to be clamped against the underface of the head member; a first part of a threaded coupling means at the other end of each extractor bar; a plurality of puller elements each comprised of a body part having a working end and an attachment end, the attachment ends each incorporate a second part of the threaded coupling means whereby the puller elements can be removably secured respectively to the extractor bars, the working end of each puller element comprises a modified sphere joined by a neck to said body part; the modification of the sphere of each puller element includes a pair of parallel faces in planes which are symmetrically disposed relative to a primary axis passing through the puller element body and which is also the axis of the threaded coupling means, said neck and the spherical portions of the sphere; the spacing between the planes is predetermined in accordance with the spacing between the inner and outer races of the ball bearing with which the puller element is designed to co-operate; and a cage clearing surface on the sphere, said surface lies diametrically opposite said neck and is intersected by said primary axis.

2. A puller as claimed in claim 1 wherein the threaded coupling means comprises a threaded hole and a threaded spigot.

3. A puller as claimed in claim 1 wherein the clamping means on each extractor bar shank comprises an external thread on each shank and a nut on each thread.

4. A puller as claimed in claim 1 wherein the head member is an elongated bar like member.

* * * * *